US 10,879,836 B2

(12) United States Patent
Markiewicz et al.

(10) Patent No.: US 10,879,836 B2
(45) Date of Patent: Dec. 29, 2020

(54) MOUNTING ASSEMBLY FOR MOUNTING A SOLAR PANEL

(71) Applicant: Preformed Line Products Co., Mayfield Village, OH (US)

(72) Inventors: John B. Markiewicz, Mentor, OH (US); Darius J. Kaunas, Medina, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 0 days.

(21) Appl. No.: 15/936,553

(22) Filed: Mar. 27, 2018

(65) Prior Publication Data
US 2019/0305716 A1 Oct. 3, 2019

(51) Int. Cl.
| | |
|---|---|
| *H02S 20/23* | (2014.01) |
| *H02S 20/10* | (2014.01) |
| *F24S 25/15* | (2018.01) |
| *F24S 25/11* | (2018.01) |

(52) U.S. Cl.
CPC .............. *H02S 20/23* (2014.12); *F24S 25/11* (2018.05); *F24S 25/15* (2018.05); *H02S 20/10* (2014.12)

(58) Field of Classification Search
CPC H02S 20/10; H02S 20/23; F24S 25/15; F24S 25/11
See application file for complete search history.

(56) References Cited

U.S. PATENT DOCUMENTS

| | | | | |
|---|---|---|---|---|
| 4,103,672 A | * | 8/1978 | Meyer ................... | F24S 23/745 126/604 |
| 4,138,994 A | * | 2/1979 | Shipley, Jr. ............. | F24S 40/52 126/694 |
| 4,159,710 A | * | 7/1979 | Prast ....................... | F24S 50/20 126/582 |
| 4,187,123 A | * | 2/1980 | Diggs ................... | G01S 3/7861 136/206 |
| 4,316,448 A | * | 2/1982 | Dodge ................ | H01L 31/0547 126/600 |
| 4,345,582 A | * | 8/1982 | Aharon ................... | F24S 23/70 126/574 |
| 4,365,617 A | * | 12/1982 | Bugash ................. | F24S 30/455 126/578 |
| 4,404,465 A | * | 9/1983 | Miller ................... | G01S 3/7861 250/203.4 |
| 4,429,178 A | * | 1/1984 | Prideaux ............. | H01L 31/0547 136/246 |

(Continued)

OTHER PUBLICATIONS

Int. Search Report/Written Opinion cited in PCT Application No. PCT/US2018/036207 dated Jul. 23, 2018, 13 pgs.

*Primary Examiner* — Golam Mowla
(74) *Attorney, Agent, or Firm* — Cooper Legal Group, LLC

(57) ABSTRACT

A mounting assembly for mounting a solar panel to a surface includes a mounting base that is supported on the surface. The mounting base defines an elongated opening that extends along an axis. A module mount can be coupled to the mounting base. The module mount includes a first mount portion that is received within the elongated opening of the mounting base such that the module mount is movable with respect to the mounting base along the axis. A second mount portion is coupled to the solar panel for mounting the solar panel to the surface through the mounting base.

11 Claims, 18 Drawing Sheets

(56) References Cited

U.S. PATENT DOCUMENTS

| | | | | |
|---|---|---|---|---|
| 4,765,309 A * | 8/1988 | Legge | F24S 30/458 | 126/601 |
| 4,995,377 A * | 2/1991 | Eiden | F24S 30/48 | 126/605 |
| 5,131,955 A * | 7/1992 | Stern | B64G 1/443 | 136/245 |
| 5,228,924 A * | 7/1993 | Barker | F24S 30/425 | 136/246 |
| 5,253,637 A * | 10/1993 | Maiden | F24S 23/74 | 126/696 |
| 5,505,788 A * | 4/1996 | Dinwoodie | F24S 25/15 | 136/246 |
| 5,542,409 A * | 8/1996 | Sampayo | F24S 23/77 | 126/606 |
| 5,632,823 A * | 5/1997 | Sharan | H02S 20/32 | 136/246 |
| 5,730,117 A * | 3/1998 | Berger | F24S 50/20 | 126/604 |
| 5,776,262 A * | 7/1998 | Melchior | H01L 31/048 | 136/251 |
| 6,722,357 B2 * | 4/2004 | Shingleton | F24S 30/425 | 126/600 |
| 7,888,588 B2 * | 2/2011 | Shingleton | F24S 50/20 | 136/246 |
| 8,459,249 B2 * | 6/2013 | Corio | F24S 30/425 | 126/600 |
| 2003/0070705 A1 * | 4/2003 | Hayden | F24S 25/12 | 136/251 |
| 2003/0101662 A1 * | 6/2003 | Ullman | F24S 25/33 | 52/27 |
| 2009/0235975 A1 * | 9/2009 | Shingleton | H02S 20/32 | 136/246 |
| 2010/0212714 A1 | 8/2010 | Rothschild et al. | | |
| 2012/0199180 A1 | 8/2012 | Salam | | |
| 2013/0111713 A1 | 5/2013 | McPheeters | | |

* cited by examiner

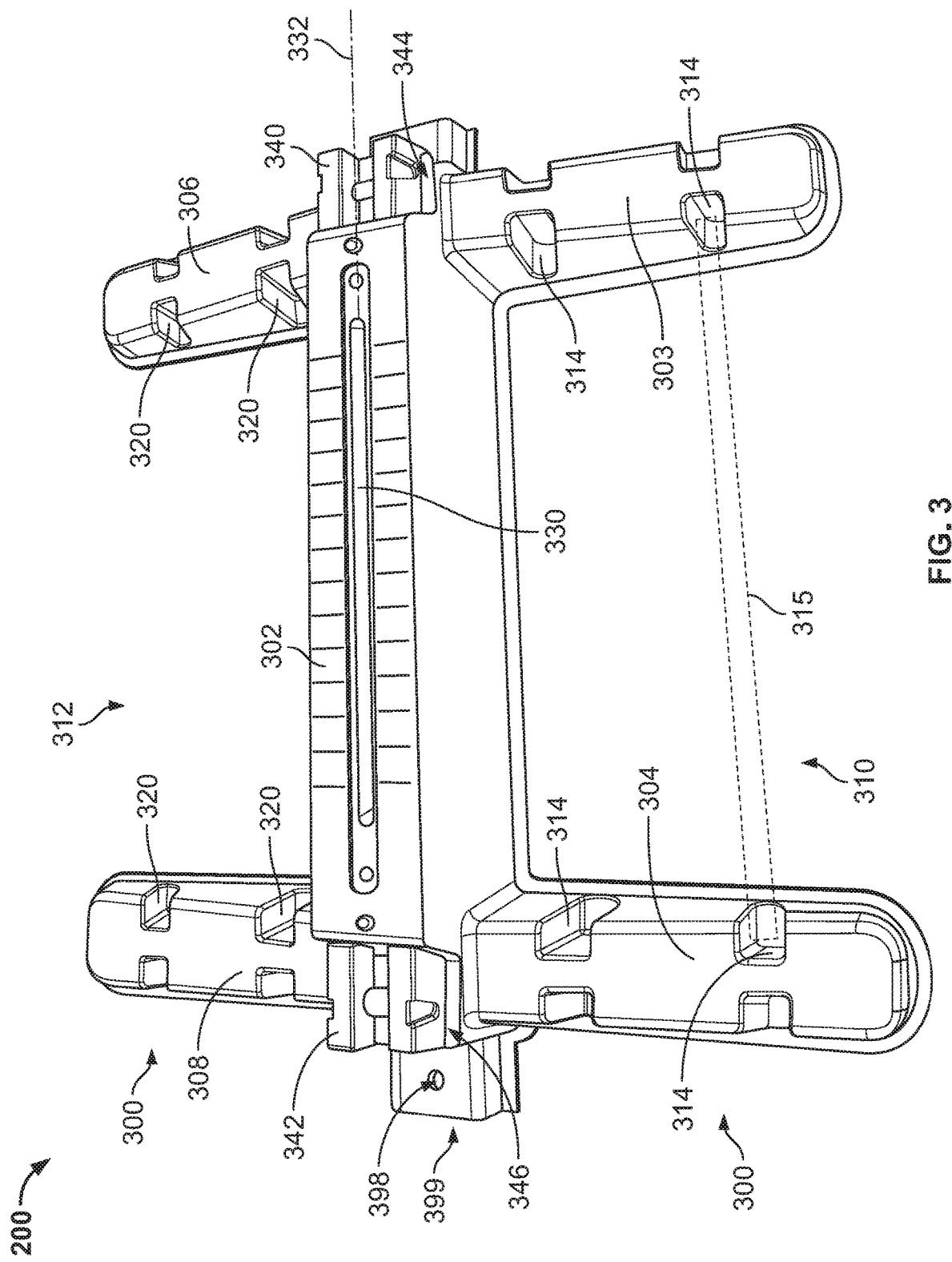

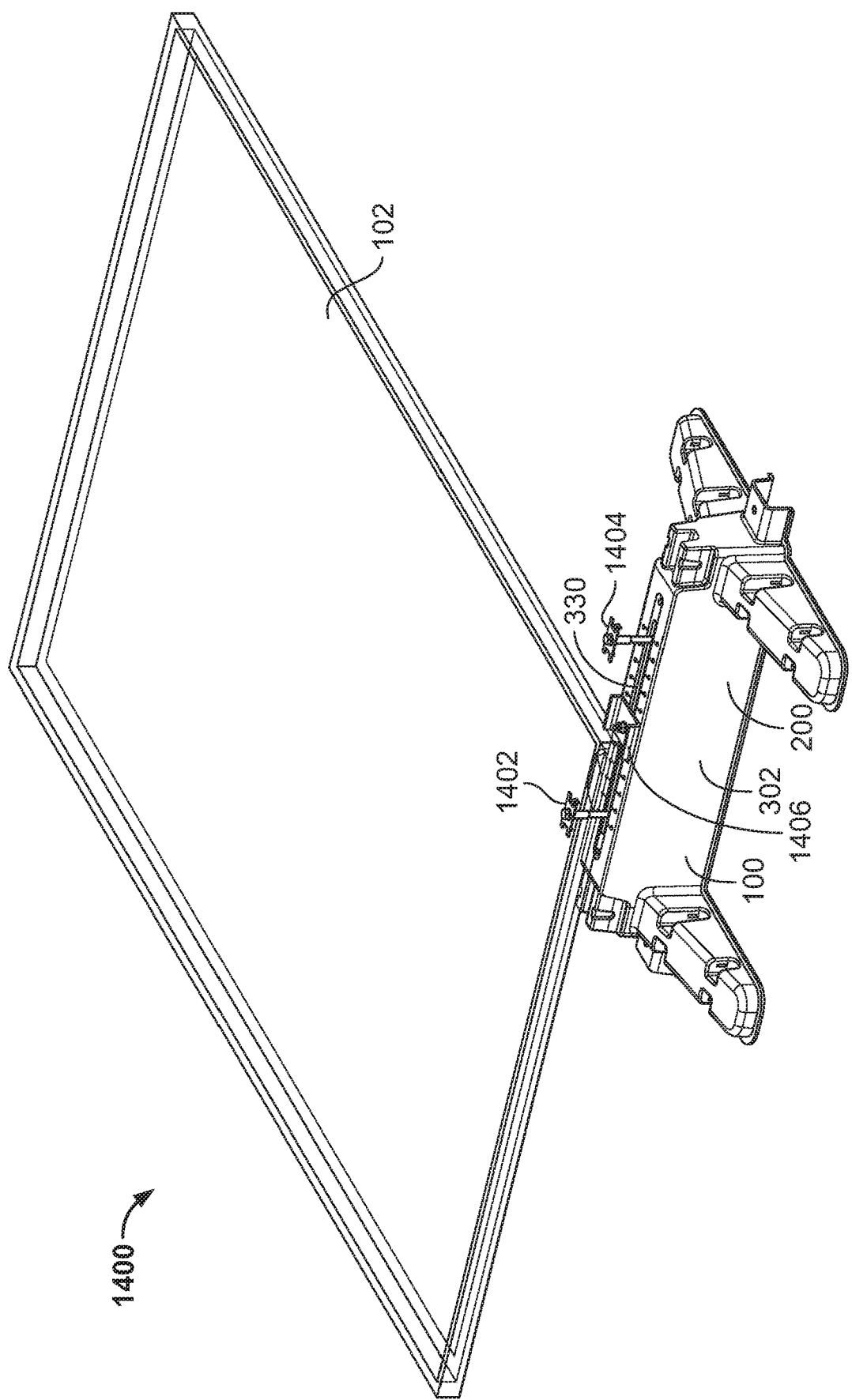

MOUNTING ASSEMBLY FOR MOUNTING A SOLAR PANEL

TECHNICAL FIELD

The instant application is directed towards a mounting assembly. For example, the instant application is directed towards a mounting assembly for mounting a solar panel to a surface.

BACKGROUND

Mounting assemblies may be used for mounting a solar panel. Mounting assemblies can be used to mount a solar panel to a surface, such as a roof.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a mounting assembly for mounting a solar panel to a surface is provided. The mounting assembly comprises a mounting base configured to be supported on the surface. The mounting base defines an elongated opening that extends along an axis. A module mount is configured to be coupled to the mounting base. The module mount comprises a first mount portion configured to be received within the elongated opening of the mounting base such that the module mount is movable with respect to the mounting base along the axis. A second mount portion is configured to be coupled to the solar panel for mounting the solar panel to the surface through the mounting base.

In an example, a mounting assembly for mounting a solar panel to a surface is provided. The mounting assembly comprises a mounting base comprising a body portion configured to be supported on the surface. The body portion is configured to accommodate a module mount to which the solar panel is coupled such that the solar panel is mounted to the surface through the mounting base.

In an example, a mounting assembly for mounting a solar panel to a surface is provided. The mounting assembly comprises a module mount comprising a first mount portion configured to be coupled to a mounting base such that the module mount is movable with respect to the mounting base along an axis. The mounting assembly comprises a second mount portion configured to be coupled to the solar panel for mounting the solar panel to the surface through the mounting base.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DESCRIPTION OF THE DRAWINGS

FIG. 3 is an illustration of a portion of an example mounting assembly for mounting a solar panel to a surface;

FIG. 14A is an illustration of an example mounting assembly for mounting a solar panel to a surface;

DETAILED DESCRIPTION

Figure 1:
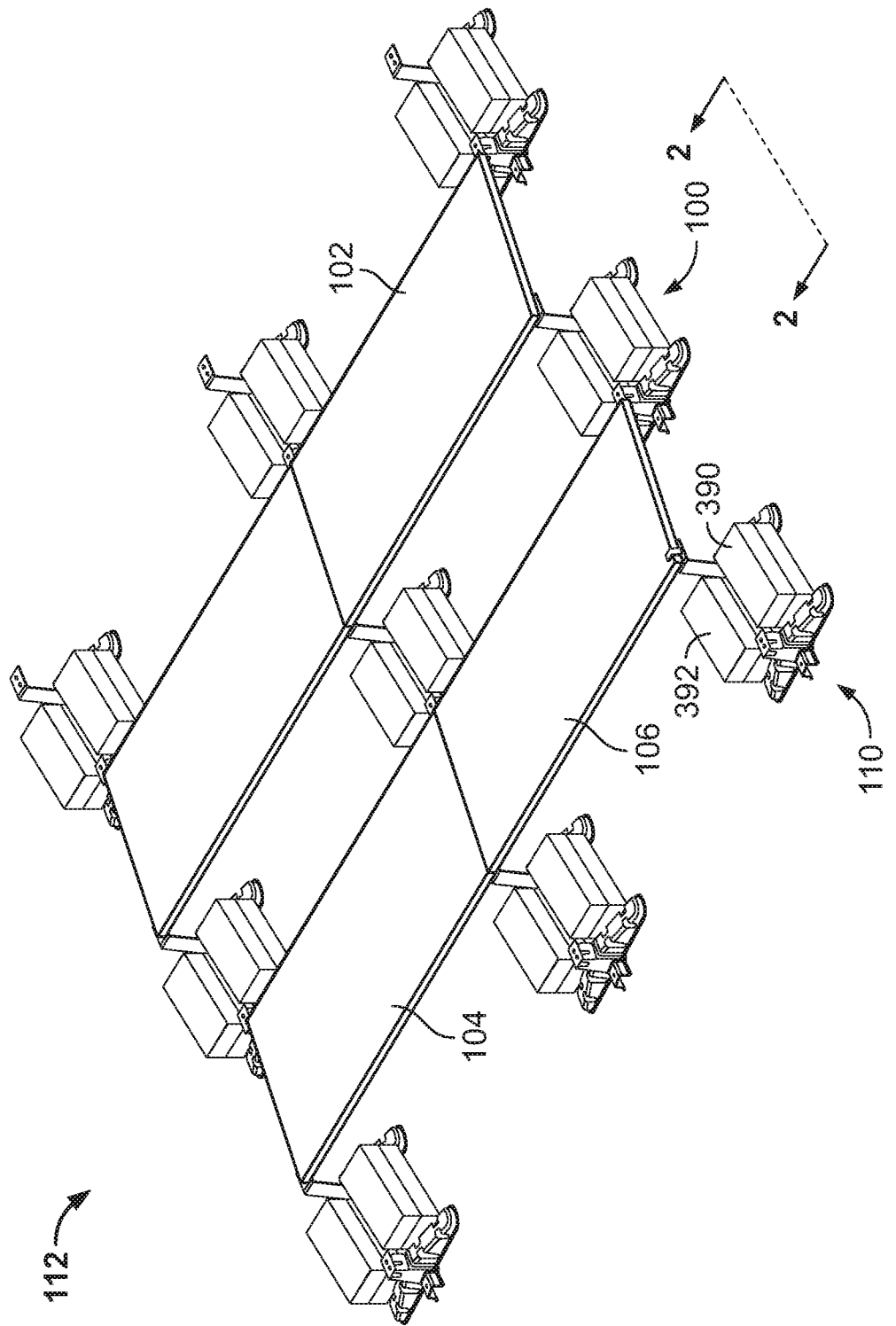
FIG. 1 is an illustration of an example mounting assembly for mounting a solar panel to a surface.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Turning to FIG. 1, an example mounting assembly 100 for mounting a solar panel 102 to a surface 104 is illustrated. The surface 104 can form a portion of a roof (e.g., of a building, a house, etc.), the ground, etc. In an example, the surface 104 can be substantially planar and may extend horizontally, though in some examples, the surface 104 can be angled. As will be described herein, the mounting assembly 100 can allow for adjustability of the solar panel 102 with respect to the surface 104. For example, the solar panels 102 may be movable with respect to the mounting assembly 100. Such adjustability and/or movability can allow for a reduced size of a gap/space between adjacent solar panels 106. In addition or in the alternative, such adjustability and/or movability can allow for accommodation of surface structures on the surface 104, such as vents, air conditioners, etc. In an example, a plurality of mounting assemblies (e.g., the mounting assembly 100, a second mounting assembly 110, etc.) can be provided as part of a system 112 that mounts the solar panels 102, 106, etc. to the surface 104.

Figure 2:
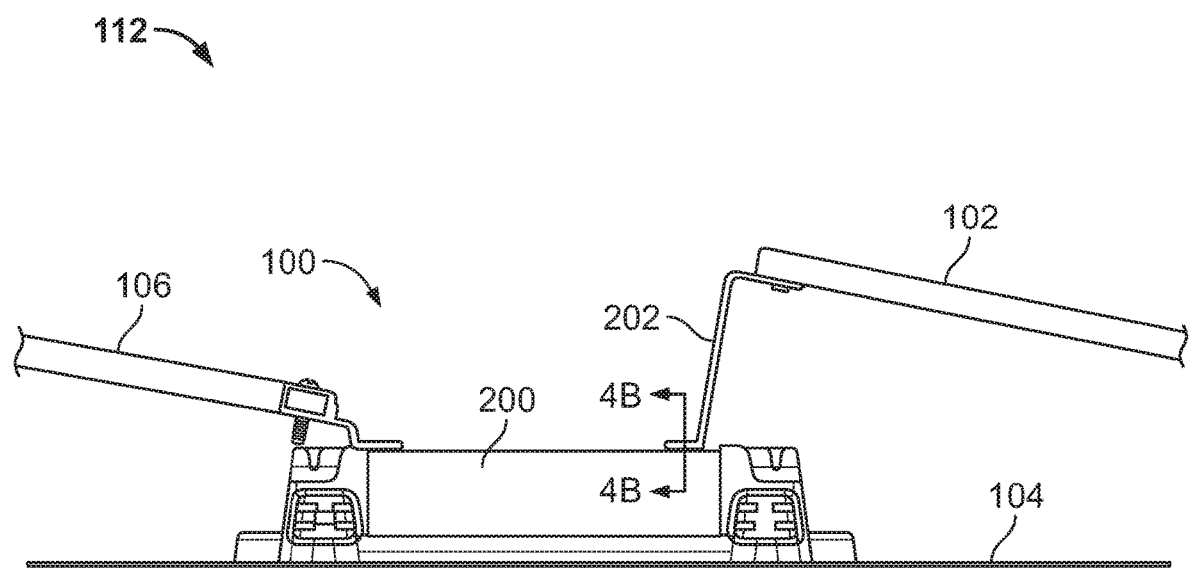
FIG. 2 is an illustration of an example mounting assembly for mounting a solar panel to a surface.

Referring to FIG. 2, a side view of the system 112 comprising the mounting assembly 100 and the second mounting assembly 110 is illustrated as viewed from the perspective of lines 2-2 of FIG. 1. It will be appreciated that the mounting assembly 100 is substantially similar to the second mounting assembly 110 of FIG. 1. In an example, the mounting assembly 100 can support an end of the solar panels 102, 106 while the second mounting assembly 110 (e.g., illustrated in FIG. 1) can support an opposite end of one or more solar panels (e.g., 102 or 106). In this way, the mounting assembly 100 and the second mounting assembly 110 can mount a solar panel to the surface 104.

In an example, the mounting assembly 100 comprises a mounting base 200 and a module mount 202. The mounting base 200 is supported on the surface 104 while the module mount 202 is coupled to the mounting base 200. In an example, the module mount 202 may be coupled to the solar panel 102. The module mount 202 may have a substantially planar bottom surface such that the module mount 202 may be substantially flush against the surface 104.

Referring to FIG. 3, an example of the mounting base 200 is illustrated. The mounting base 200 comprises one or more leg portions 300 that are coupled to a body portion 302. In an example, the one or more leg portions 300 may be supported on the surface 104. The one or more leg portions 300 may comprise a first leg portion 303, a second leg portion 304, a third leg portion 306, and a fourth leg portion 308. The first leg portion 303 and the second leg portion 304 can be disposed on a first side of the body portion 302, while the third leg portion 306 and the fourth leg portion 308 can be disposed on a second side of the body portion 302.

In an example, the first leg portion 303 and the second leg portion 304 can be spaced apart from each other while extending substantially parallel to each other. The first leg portion 303 and the second leg portion 304 can define a first mounting opening 310. The first mounting opening 310 can be bordered by the first leg portion 303, the second leg portion 304, and the body portion 302.

In an example, the first leg portion 303 and the second leg portion 304 can define one or more first leg openings 314. The first leg openings 314 may be defined in a sidewall of the first leg portion 303 and the second leg portion 304 that border the first mounting opening 310. In this way, the first leg openings 314 can receive a support structure 315 (e.g., a rod, a beam, a bar, etc.) that extends between the first leg portion 303 and the second leg portion 304. It is to be appreciated that FIG. 3 illustrates only one support structure 315 (e.g., illustrated with dashed lines) supported in a pair of the first leg openings 314. In operation, however, up to four support structures may be provided (e.g., disposed within leg openings) in a similar manner as the support structure 315. For example, one or more additional support structures 315 may be positioned in some or all of the first leg openings 314 of the first leg portion 303 and the second leg portion 304. A first weight 390 (e.g., illustrated in FIG. 1) can be supported on the support structures (e.g., 315, etc.) so as to hold the mounting base 200 in place relative to the surface 104.

In an example, the third leg portion 306 and the fourth leg portion 308 can be spaced apart from each other while extending substantially parallel to each other. The third leg portion 306 and the fourth leg portion 308 can define a second mounting opening 312. The second mounting opening 312 can be bordered by the third leg portion 306, the fourth leg portion 308, and the body portion 302. In an example, the third leg portion 306 and the fourth leg portion 308 define one or more second leg openings 320. The second leg openings 320 may be defined in a sidewall of the third leg portion 306 and the fourth leg portion 308 that border the second mounting opening 312. In this way, the second leg openings 320 can receive a support structure (e.g., a rod, a beam, a bar, etc.) that extends between the third leg portion 306 and the fourth leg portion 308. For example, one or more additional support structures 315 may be positioned in some or all of the second leg openings 320 of the third leg portion 306 and the fourth leg portion 308. A second weight 392 (e.g., as illustrated in FIG. 1) can be supported on the support structure(s) (e.g., 315) so as to hold the mounting base 200 in place relative to the surface 104. In an example, the third leg portion 306 can extend substantially co-axial with the first leg portion 303, while the fourth leg portion 308 can extend substantially co-axial with the second leg portion 304.

The body portion 302 can be coupled to the one or more leg portions 300, and can extend between a first end 340 and a second end 342. In an example, the body portion 302 of the mounting base 200 can define an elongated opening 330 that extends along an axis 332. The body portion 302 is configured to be supported on the surface 104. In an example, the axis 332 can extend non-perpendicular to the surface 104. In another example, the axis 332 can extend substantially parallel to the surface 104.

The elongated opening 330 can extend between the first end 340 and the second end 342 of the body portion 302. In this way, the axis 332 along which the elongated opening 330 extends can be oriented substantially non-parallel (e.g., perpendicular in an example) to a direction along which the first leg portion 303, the second leg portion 304, the third leg portion 306, and/or the fourth leg portion 308 extend. As will be described herein, the body portion 302 is configured to receive the module mount 202 to which the solar panel 102 is coupled, within the elongated opening 330. In this way, the module mount 202 can be movable with respect to the mounting base 200 along the axis 332 while mounting the solar panel 102 to the surface 104 through the mounting base 200.

In an example, the mounting base 200 comprises one or more anchor openings 398. The anchor openings 398 may be disposed at opposing ends of the mounting base 200 (e.g., the right-most anchor opening is obstructed from view in FIG. 3, but is substantially similar to the left-most anchor opening 398). In an example, the anchor openings 398 may be defined along an axis that is substantially perpendicular to the surface upon which the mounting base 200 rests. In this way, a fastener can be inserted through the anchor openings 398 and may directly or indirectly be embedded in the surface. In this way, the mounting base can be attached to the surface. Such attachment may be beneficial, for example, in locations that may experience inclement weather, such as earthquakes, heavy winds, precipitation, etc.

The mounting base 200 can comprise any number of materials. For example, the mounting base 200 can comprise metal materials, non-metal materials (e.g., plastics, composites, etc.), or the like. In an example, the first end 340 and the second end 342 of the body portion 302 can comprise a first recessed portion 344 and a second recessed portion 346 to allow for attachment to a beam or other similar structure.

Figure 4A:
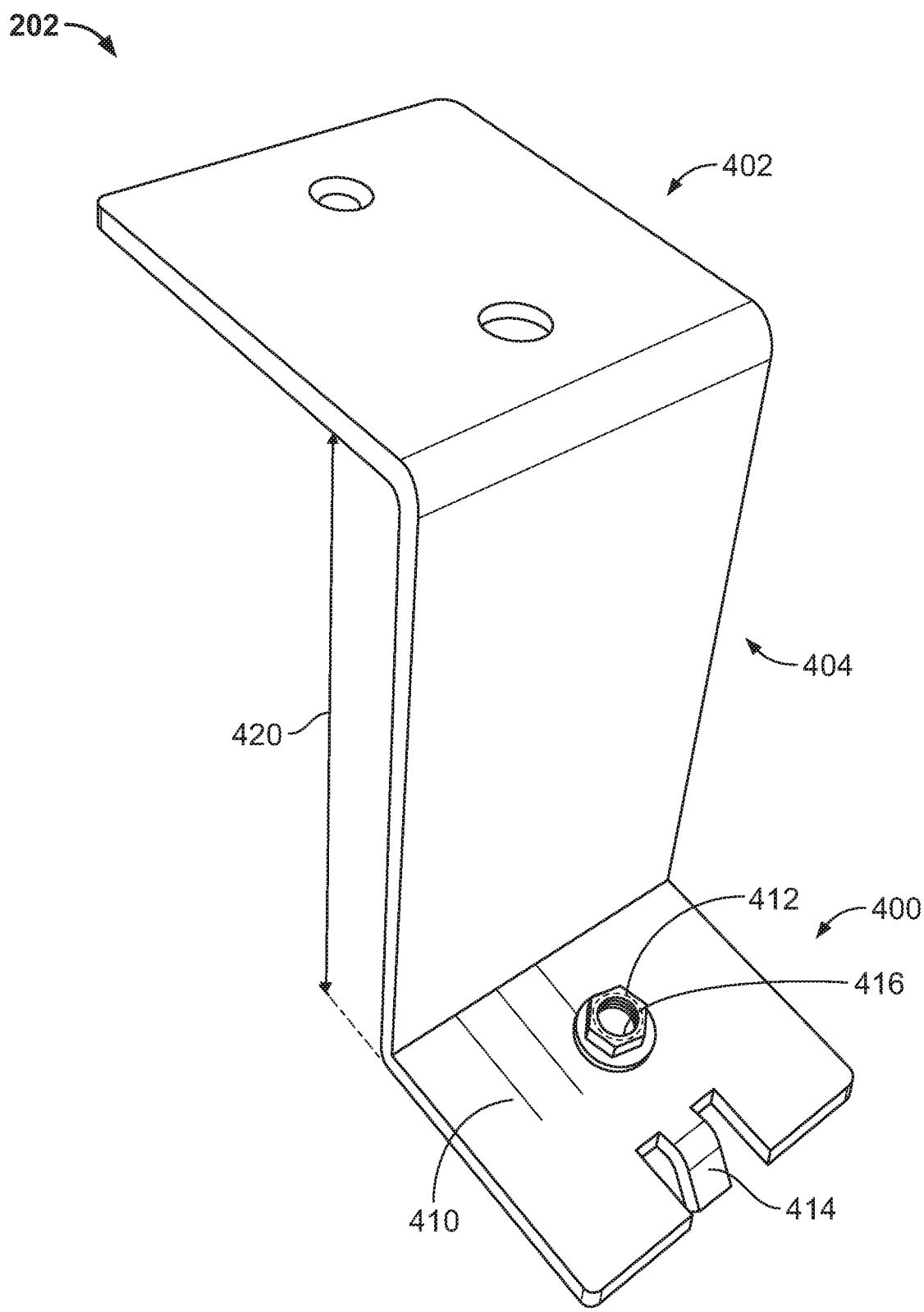
FIG. 4A is an illustration of a portion of an example mounting assembly for mounting a solar panel to a surface.

Referring to FIG. 4A, an example of the module mount 202 is illustrated. The module mount 202 is configured to be coupled to the mounting base 200 (e.g., illustrated in FIG. 3). In an example, the module mount 202 comprises a first mount portion 400, a second mount portion 402, and an intermediate mount portion 404.

The first mount portion 400 is configured to engage and/or be received within the elongated opening 330 of the mounting base 200 such that the module mount 202 is movable with respect to the mounting base 200 along the axis 332. It will be appreciated that the term "received" is not intended to be limited to an interpretation in which the entirety of the first mount portion 400 is received within the elongated opening 330. Rather, in an example, by being received within the elongated opening 330, some, or all, of the first mount portion 400 may be received within the elongated opening 330.

The first mount portion 400 comprises a first plate 410. The first plate 410 can comprise a substantially planar structure that may be positioned in contact with the body portion 302. A first side of the first plate 410 may be in contact with the body portion 302, while a second side of the first plate 410 may face away from the body portion 302. The first plate 410 can define a first plate opening 412 (e.g., also illustrated in FIG. 4B).

The first mount portion 400 comprises a first fastener 416 that is configured to be received through the first plate opening 412. In an example, the first fastener 416 comprises one or more mechanical fastening structures, such as a screw, a bolt, a washer, a nut, etc. In this way, the first fastener 416 can pass through the first plate opening 412 of the first plate 410 and through the elongated opening 330 of the body portion 302 of the mounting base 200. As such, the first fastener 416 can attach and/or couple the module mount 202 to the mounting base 200.

In an example, the first mount portion 400 comprises a first tab 414 that is attached to the first plate 410. The first tab 414 can project towards the body portion 302 of the mounting base 200. The first tab 414 can have a width that is smaller than or equal to a width of the elongated opening 330. Accordingly, in an example, the first tab 414 can be received within the elongated opening 330, such that the first tab 414 can limit inadvertent rotation of the module mount 202 relative to the mounting base 200. That is, with the first fastener 416 and the first tab 414 received within the elongated opening 330, rotational movement of the module mount 202 is substantially limited, but selective movement of the module mount 202 along the axis 332 is provided for. In an example, the first fastener 416 can be tightened or loosened between a first position, in which the first fastener 416 is tightened and the module mount 202 is substantially limited from moving relative to the mounting base 200, and a second position, in which the first fastener 416 is loosened and the module mount 202 is movable relative to the mounting base 200.

The second mount portion 402 of the module mount 202 can be coupled to the solar panel 102 for mounting the solar panel 102 to the surface 104 through the mounting base 200. In an example, the second mount portion 402 can be coupled to the first mount portion 400 by an intermediate mount portion 404. The intermediate mount portion 404 can extend between the first mount portion 400 and the second mount portion 402, with one end of the intermediate mount portion 404 attached to the first mount portion 400, and an opposing end of the intermediate mount portion 404 attached to the second mount portion 402. The intermediate mount portion 404 can extend a longer or shorter distance than as illustrated, such that the second mount portion 402 can be spaced a longer or shorter distance apart from the first mount portion 400. In an example, the second mount portion 402 can extend along a plane and may be substantially parallel to the first mount portion 400. The second mount portion 402 may be spaced a distance 420 apart from the first mount portion.

Figure 4B:
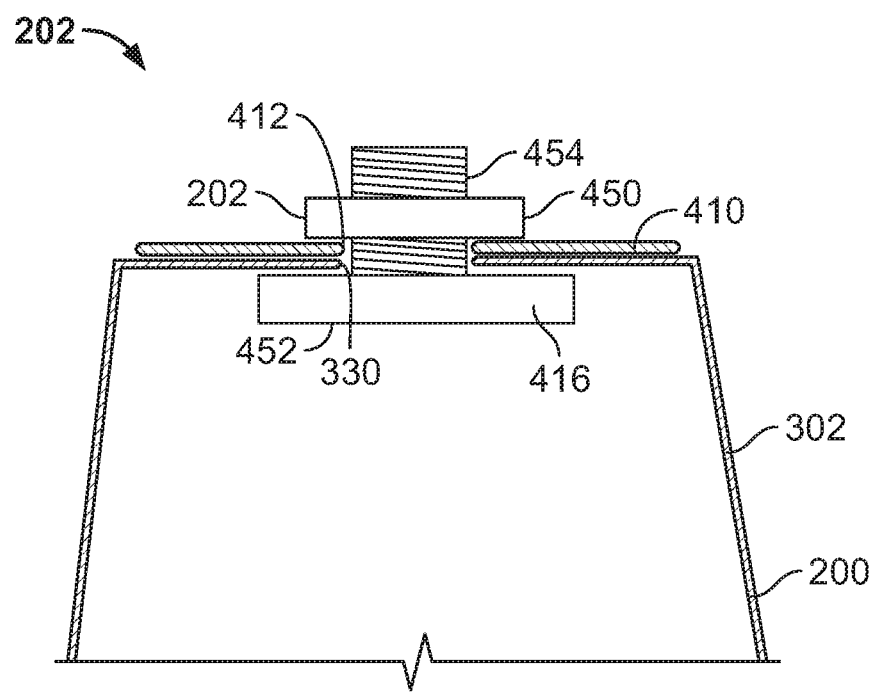
FIG. 4B is an illustration of a portion of an example mounting assembly for mounting a solar panel to a surface.

Referring to FIG. 4B, an example of the module mount 202 being attached to the body portion 302 of the mounting base 200 is illustrated as viewed from the perspective indicated by lines 4B-4B in FIG. 2. In an example, the first fastener 416 comprises a nut 450, a head 452, and a threaded portion 454. The first fastener 416 can be inserted through the first plate opening 412 of the first plate 410 and through the elongated opening 330 of the body portion 302. In an example, the head 452 may be larger in cross-sectional size than the first plate opening 412 and the elongated opening 330. In this way, the head 452 is limited from being inadvertently passed through the first plate opening 412 and the elongated opening 330. The nut 450 may be attached to the threaded portion 454 (e.g., by screwing the nut 450 onto the threaded portion 454). In an example, the nut 450 may have a larger cross-sectional size than the first plate opening 412 and the elongated opening 330. In this way, the nut 450 is limited from being inadvertently passed through the first plate opening 412 and the elongated opening 330. In an example, the nut 450 can be loosened to allow for the module mount 202 to be moved and/or adjusted along the elongated opening 330 of the body portion 302. To secure the module mount 202 and limit movement, the nut 450 can be tightened onto the threaded portion 454. It will be appreciated that other structures can be provided to allow for movable/adjustable attachment of the module mount 202 relative to the body portion 302.

Figure 5:
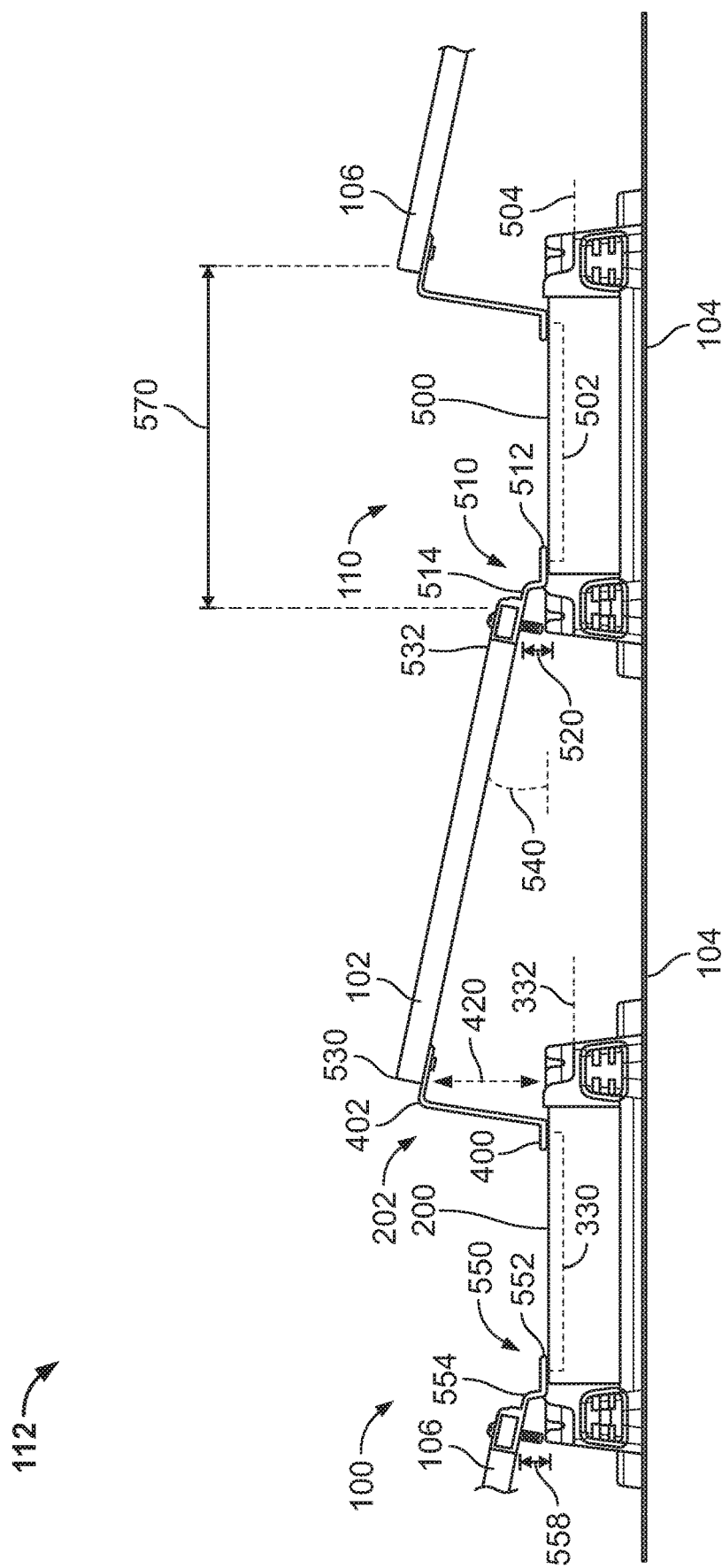
FIG. 5 is an illustration of an example mounting assembly for mounting a solar panel to a surface.

Referring to FIG. 5, the operation of the mounting assembly 100 can be described. In an example, the system 112 comprises the mounting assembly 100 and the second mounting assembly 110. The second mounting assembly 110 is substantially similar to the mounting assembly 100. For example, the second mounting assembly 110 comprises a second mounting base 500. The second mounting base 500 is substantially similar to the mounting base 200. The second mounting base 500 is configured to be supported on the surface 104, and the second mounting base 500 can define a second elongated opening 502 (e.g., illustrated with dashed lines) that extends along a second axis 504. In an example, the axis 332 and the second axis 504 are co-linear.

In an example, the second mounting assembly 110 comprises a second module mount 510 that is configured to be coupled to the second mounting base 500. The second module mount 510 is substantially similar to the module mount 202 but for having a different dimension (e.g., height). In an example, the second module mount 510 comprises a third mount portion 512 that is configured to be received within the second elongated opening 502 of the second mounting base 500. The third mount portion 512 is substantially similar to the first mount portion 400. As such, the second module mount 510 may be movable with respect to the second mounting base 500 along the second axis 504. The second module mount 510 comprises a fourth mount portion 514 that is configured to be coupled to the solar panel 102 for mounting the solar panel 102 to the surface 104 through the second mounting base 500. In an example, the fourth mount portion 514 is substantially similar to the second mount portion 402.

The second mount portion 402 may be spaced the distance 420 apart from the mounting base 200. In an example, the fourth mount portion 514 may be spaced a second distance 520 from the second mounting base 500. The distance 420 may be different than the second distance 520. For example, the distance 420 may be greater than the second distance 520, such that the module mount 202 has a greater height than the second module mount 510. In this way, the solar panel 102 can extend non-parallel to the surface 104 and/or the axis 332 and/or the second axis 504. That is, a first end 530 of the solar panel 102 can be coupled to the module mount 202 while a second end 532 of the solar panel 102 can be coupled to the second module mount 510. The first end 530 can be spaced farther away from the mounting base 200 than the second end 532 is spaced away from the second mounting base 500. In an example, the solar panel 102 can define an angle 540 with respect to the axis 332 and/or the second axis 504. The angle 540 may, in an example, bet between about 8 degrees to about 12 degrees, or between about 9 degrees to about 11 degrees, or about 10 degrees.

In an example, the mounting assembly 100 can comprise a third module mount 550. The third module mount 550 is substantially similar to the second module mount 510. For example, the third module mount 550 comprises a fifth mount portion 552 and a sixth mount portion 554, which are substantially similar to the third mount portion 512 and the fourth mount portion 514. The fifth mount portion 552 is configured to be coupled to the mounting base 200 such that the third module mount 550 is movable with respect to the mounting base 200 along the axis 332. The sixth mount portion 554 is configured to be coupled to a second solar panel 556 for mounting the solar panel 102 to the surface 104 through the second mounting base 500. In an example, the sixth mount portion 554 is spaced a third distance 558 from the mounting base 200. The distance 420 may be different than the third distance 558. In an example, the distance 420 may be greater than the third distance 558.

By allowing for the solar panels 102, 106 to be angled (e.g., 540), a space 570 between adjacent solar panels 102, 106 can be reduced. For example, if the solar panels 102, 106 were horizontally oriented and parallel to the surface 104, the solar panels 102, 106 would impart a larger footprint and/or take up more space. By angling the solar panels 102, 106, the space 570 can be reduced, thus allowing for a larger number of solar panels to be positioned on the surface 104.

Figure 6:
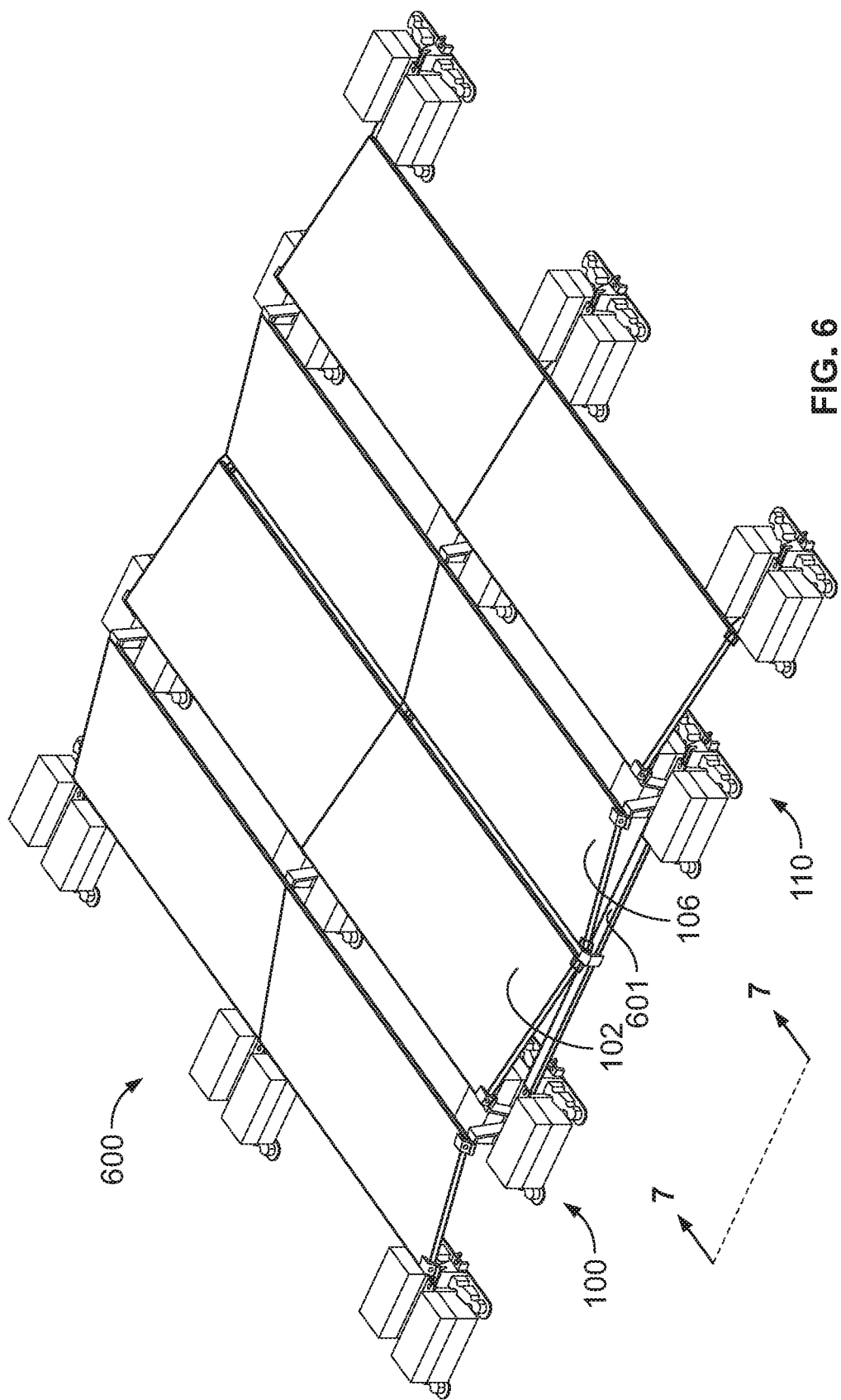
FIG. 6 is an illustration of an example mounting assembly for mounting a solar panel to a surface.
Figure 7:
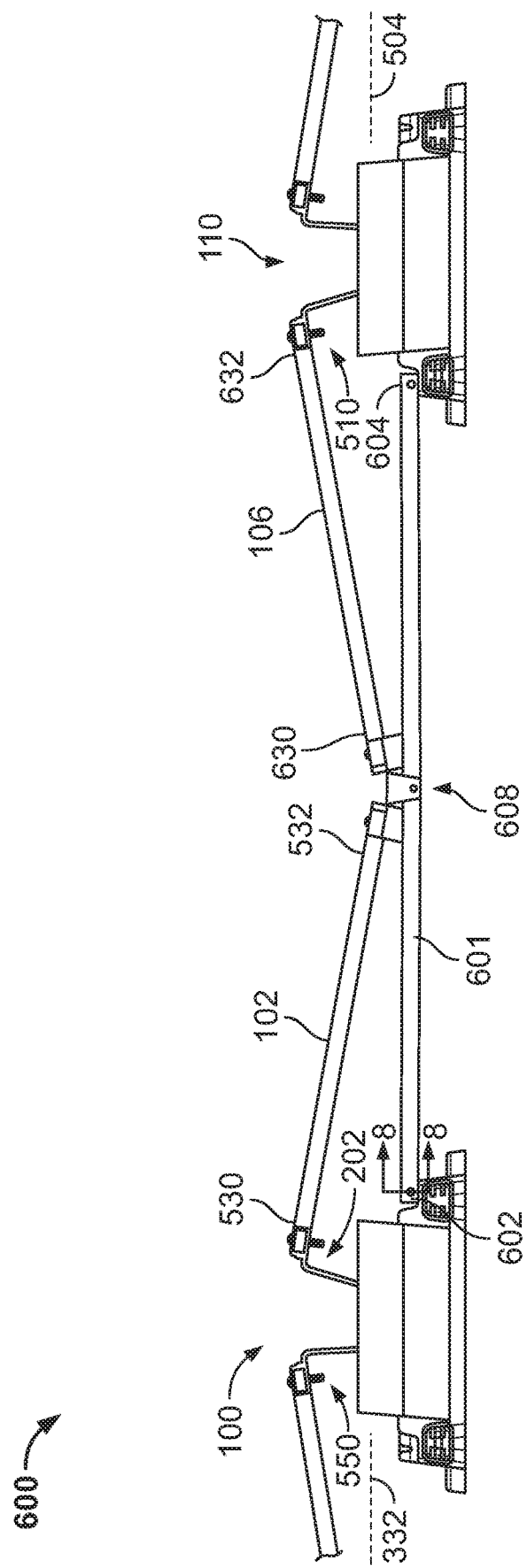
FIG. 7 is an illustration of an example mounting assembly for mounting a solar panel to a surface.

Referring to FIGS. 6 and 7, an example of a system 600 is illustrated. In an example, the system 600 comprises the mounting assembly 100 and the second mounting assembly 110, the solar panel 102 and the second solar panel 106, the module mount 202, the second module mount 510, and the third module mount 550, etc. In an example, the solar panel 102 and the second solar panel 110 can be oriented in a different orientation than as illustrated in FIGS. 1 to 5. For example, the solar panel 102 and the second solar panel 110 in FIGS. 1 to 5 are substantially parallel to each other. However, as illustrated in FIGS. 6 and 7, the solar panel 102 and the second solar panel 106 can be non-parallel to each other. That is, in the examples of FIGS. 6 and 7, the first end 530 of the solar panel 102 may be spaced a farther distance from the axis 332, 504 than the second end 532 of the solar panel 102. The first end 630 of the second solar panel 106 is spaced a shorter distance from the axis 332, 504 than the second end 632 of the second solar panel 106. In an example, the second end 532 of the solar panel 102 is adjacent to the first end 630 of the second solar panel 106. In this way, the solar panels 102, 106, etc. can form a generally V-shape, with an end of the solar panels 102, 106 (e.g., at the second end 532 and the first end 630) being a shorter distance from the axis 332, 504, while the opposing ends of the solar panels 102, 106 (e.g., at the first end 530 and the second end 632) are a farther distance from the axis 332, 504.

In an example, the system 600 comprises a support arm 601. The support arm 601 can extend between the mounting assembly 100 at a first support end 602 and the second mounting assembly 110 at a second support end 606. In an example, the first support end 602 is attached to the mounting assembly 100 while the second support end 606 is attached to the second mounting assembly 110. The first support end 602 and the second support end 606 can be attached in any number of ways, such as with mechanical fasteners, mechanical snap fit locking, etc. In an example, the support arm 601 has a substantially c-shaped cross-sectional shape, such that the support arm 601 can be inserted over the recessed portions 344, 346 (e.g., illustrated in FIG. 3) of the mounting assembly 100 and the second mounting assembly 110. For example, the first support end 602 of the support arm 601 can receive a recessed portion of the mounting assembly 100 (e.g., 344 of FIG. 3) while the second support end 604 of the support arm 601 can receive a recessed portion of the second mounting assembly 110 (e.g., similar to 346 of FIG. 3). In this way, the support arm 601 can be attached to the mounting assembly 100 and to the second mounting assembly 110. The support arm 601 can support a module mount 608 to which the solar panels 102, 106 can be attached.

In an example, the system 600 is not limited to comprising the support arm 601 and the module mount 608. Rather, in an example, the system 600 may comprise a third mounting assembly that is similar to the mounting assembly 100 and the second mounting assembly 110. The third mounting assembly may rest upon a surface in a similar manner as the mounting assembly 100 and the second mounting assembly 110. The third mounting assembly may be positioned at the location indicated by the module mount 608. In this way, the ends (e.g., the second end 532 and the first end 630) of the solar panel 102 and the second solar panel 106 can be attached to the third mounting assembly. As such, in an example, the system 600 may omit the support arm 601 and/or the module mount 608, while substituting a third mounting assembly to support the ends (e.g., the second end 532 and the first end 630) of the solar panel 102).

Figure 8:
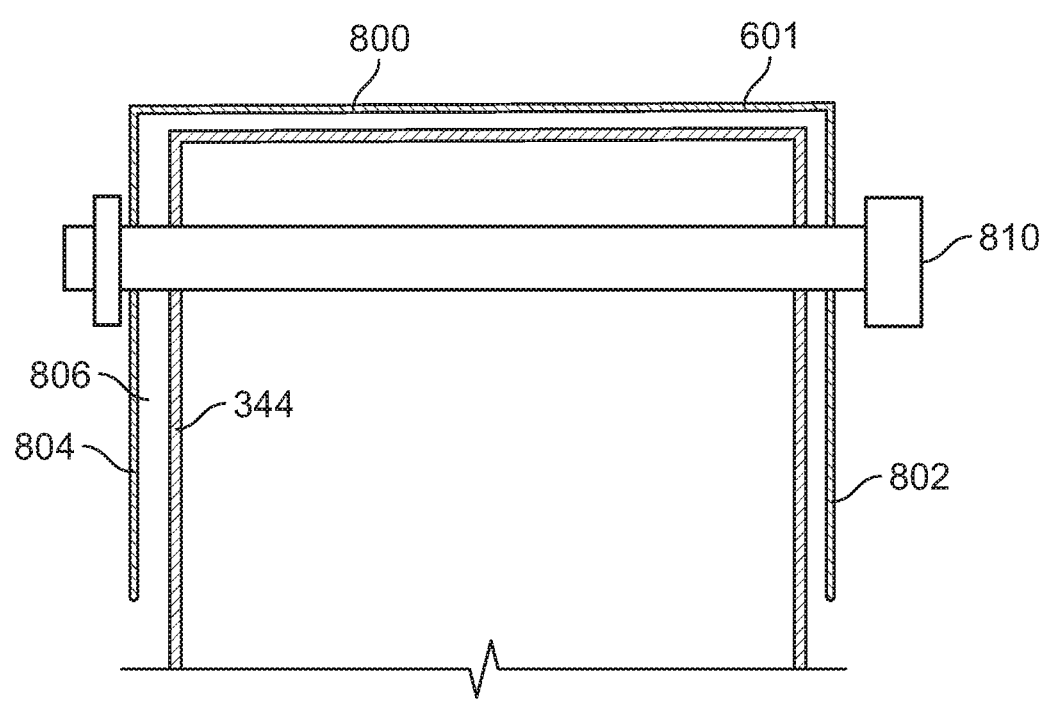
FIG. 8 is an illustration of a portion of an example mounting assembly for mounting a solar panel to a surface.

Referring to FIG. 8, a sectional view of the support arm 601 along lines 8-8 of FIG. 7 is illustrated. In an example, the support arm 601 comprises a first wall 800, a second wall 802, and a third wall 804. Together, the first wall 800, the second wall 802, and the third wall 804 can define a substantially hollow interior 806. In an example, the first recessed portion 344 can be received within the interior 806. In this way, the second wall 802 and the third wall 804 of the support arm 601 can be spaced a distance apart so as to receive the first recessed portion 344. In an example, to attach the support arm 601 to the first recessed portion 344 and limit the likelihood of inadvertent detachment, a fastener 808 can be provided. The fastener 808 may be inserted into openings in the second wall 802, the third wall 804, and/or the first recessed portion 344.

Figure 9:
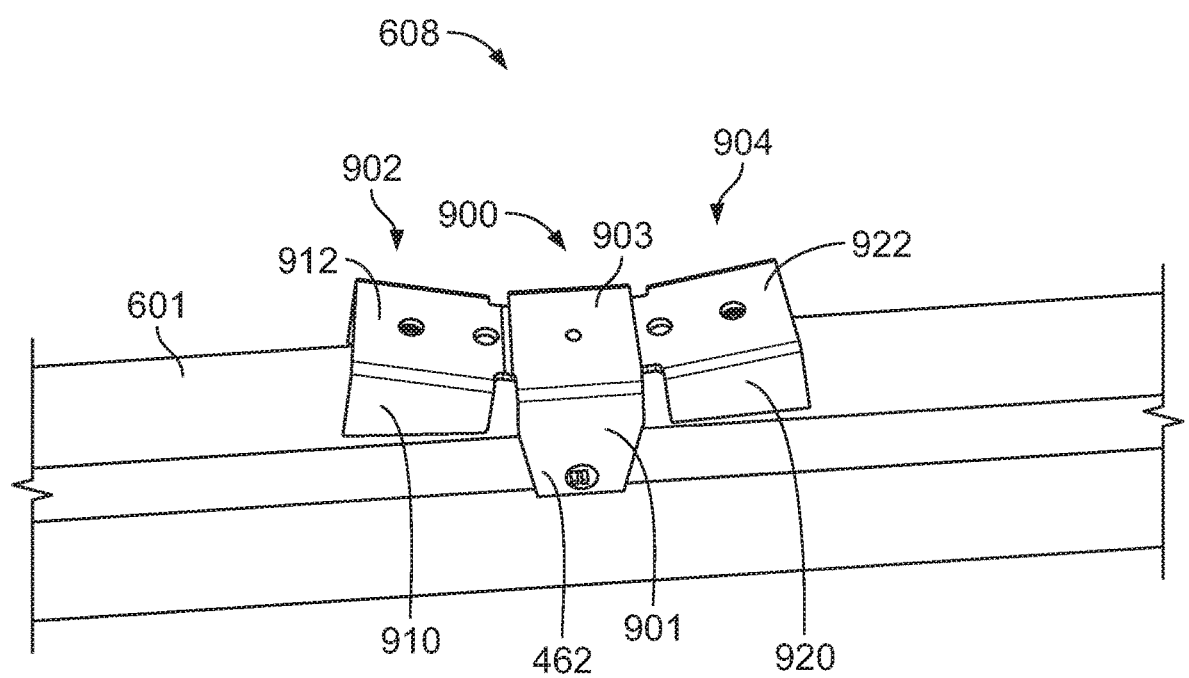
FIG. 9 is an illustration of a portion of an example assembly for mounting a solar panel to a surface.

Referring to FIG. 9, the module mount 608 is illustrated. In an example, the module mount 608 comprises a first mount portion 900, a second mount portion 902, and a third mount portion 904. The first mount portion 900 can be attached to the support arm 601. For example, the first mount portion 900 may comprise one or more first sidewalls 901 that can be attached to the support arm 601. The first sidewalls 901 can be spaced apart to define an opening into which the support arm 601 is received within. In an example, the first sidewalls 901 may be attached to a central sidewall 903 that extends substantially parallel to the support arm 601.

The second mount portion 902 and the third mount portion 904 can be attached to and disposed on opposite sides of the first mount portion 900. For example, the second mount portion 902 comprises one or more second sidewalls 910 that are adjacent to and/or in contact with the support arm 601. The second sidewalls 910 can be angled and may be attached by a second attachment sidewall 912. The second attachment sidewall 912 can be angled with respect to the support arm 601, such as by defining an angle that is between about 1 degree and 20 degrees. The second attachment sidewall 912 can define an opening through which a fastener can extend. In this way, the solar panel 102 can be attached to the second attachment sidewall 912 (e.g., with a fastener, for example).

The third mount portion 904 comprises one or more third sidewalls 920 that are adjacent to and/or in contact with the support arm 601. The third sidewalls 920 can be angled and may be attached by a third attachment sidewall 922. The third attachment sidewall 922 can be angled with respect to the support arm 601, such as by defining an angle that is between about 1 degree and 20 degrees. The third attachment sidewall 922 can define an opening through which a fastener can extend. In this way, the second solar panel 106 can be attached to the third attachment sidewall 922 (e.g., with a fastener, for example).

Figure 10:
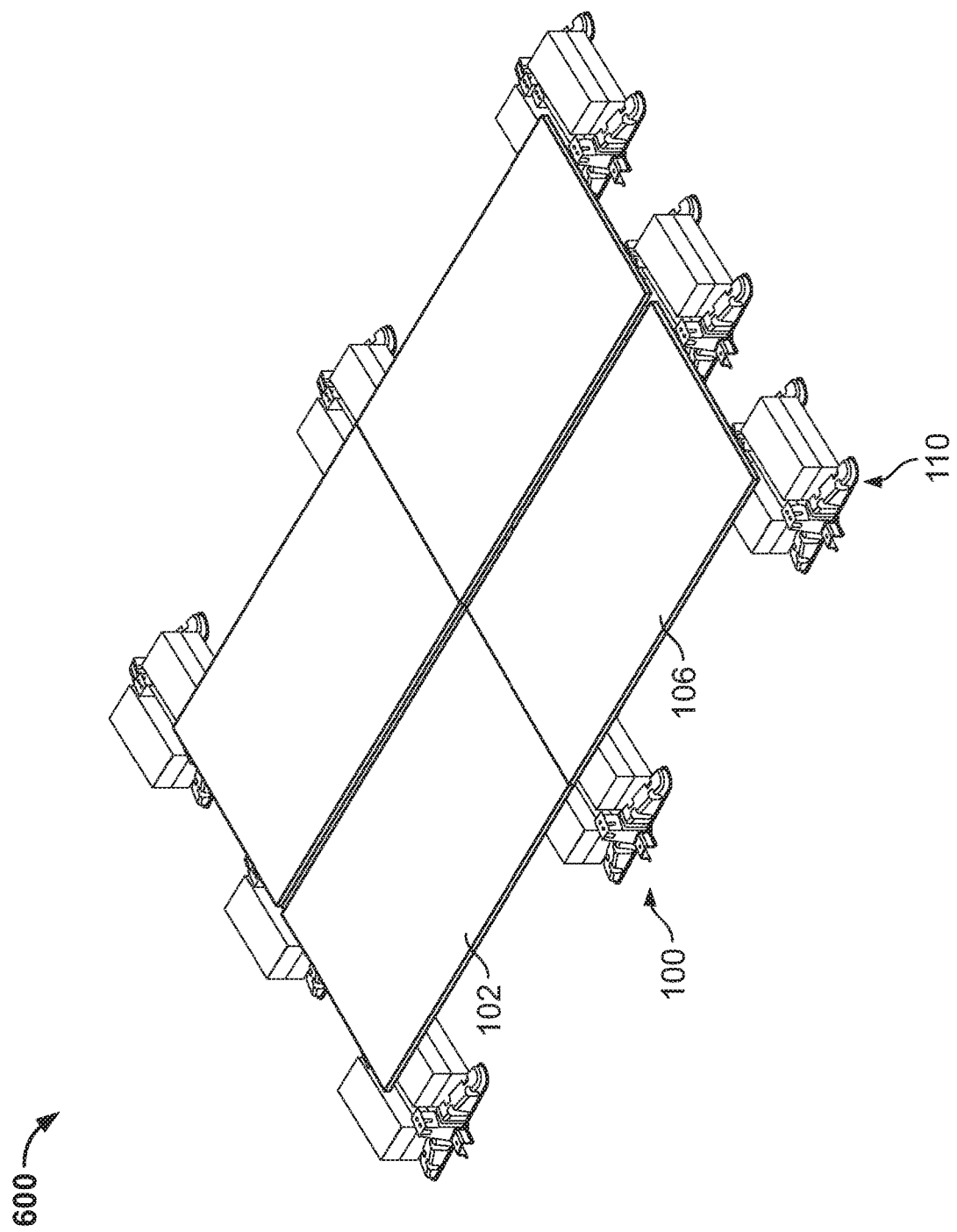
FIG. 10 is an illustration of an example mounting assembly for mounting a solar panel to a surface.

Referring to FIG. 10, an example of a system 1000 is illustrated. In an example, the system 1000 comprises the mounting assembly 100 and the second mounting assembly 110, the solar panel 102 and the second solar panel 106, and one or more module mounts (e.g., 202, 510, 550), etc. In an example, the solar panel 102 and the second solar panel 110 can be oriented in a different orientation than as illustrated in FIGS. 1 to 9. For example, the solar panel 102 and the second solar panel 110 in FIG. 10 may be substantially parallel to each other. In an example, the solar panel 102 and the second solar panel 110 may be co-planar with each other, such as by extending substantially parallel to the surface 104. In this way, the module mounts (e.g., 202, 510, 550) may the same height. In an example, the module mounts used to attach the solar panels (e.g., 102, 106) may comprise the module mounts 202. In another example, the module mounts used to attach the solar panels (e.g., 102, 106) may comprise the second module mounts 510. As such, the solar panels 102, 106, etc. can be spaced a substantially constant distance from the surface 104. In an example, the system 100 may not comprise the module mounts (e.g., 202, 510, 550). Rather, in an example, the solar panels 102, 106 can be supported on the module mounts (e.g., 202, 510, 550), such as by resting upon the mounting base.

Figure 11:
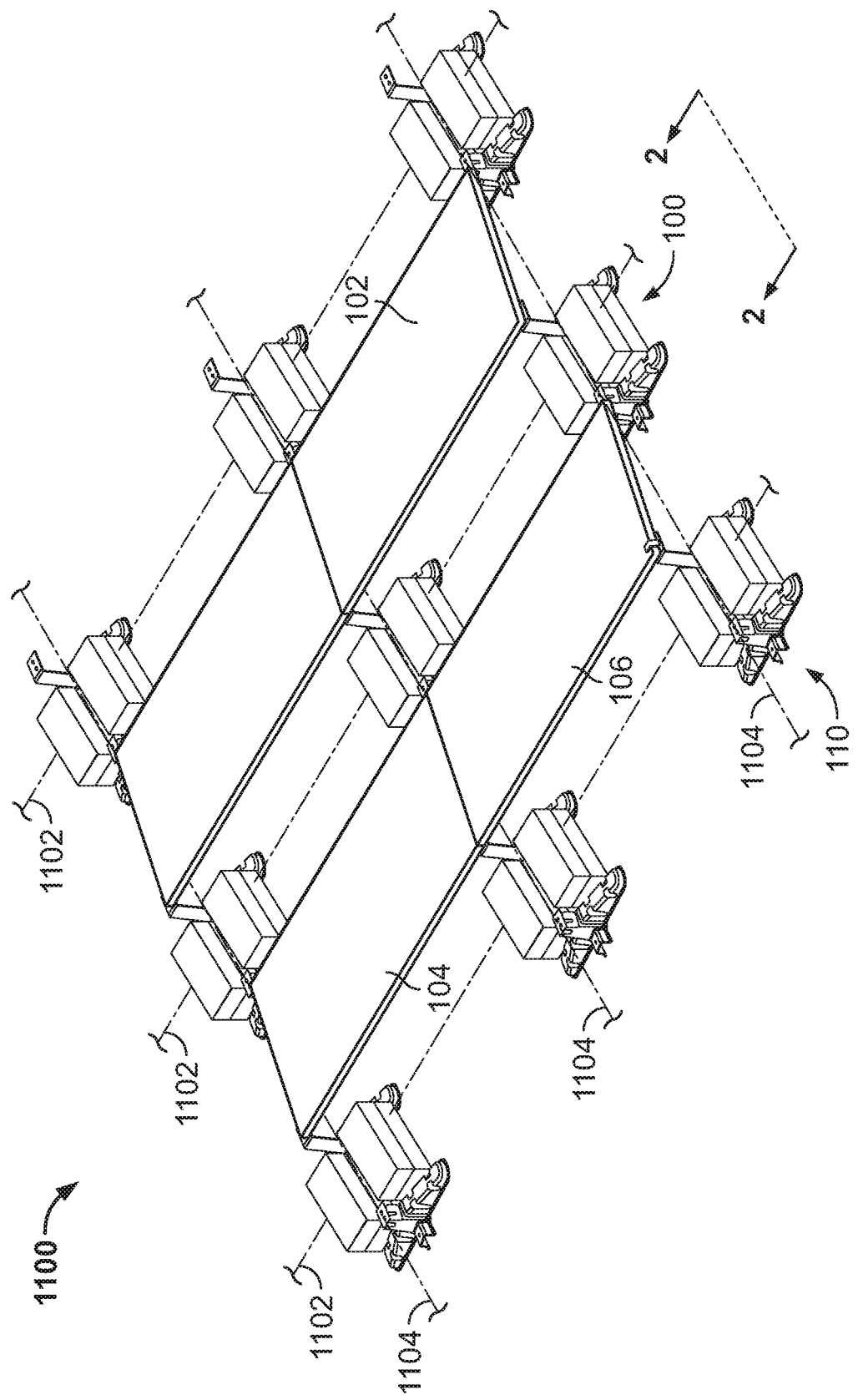
FIG. 11 an illustration of an example mounting assembly for mounting a solar panel to a surface.

Referring to FIG. 11, an example of a system 1100 is illustrated. In an example, the system 1100 comprises the mounting assembly 100 and the second mounting assembly 110, the solar panel 102, and the second solar panel 106, and one or more module mounts (e.g., 202, 510, 550), etc. In an example, the system 1100 may not comprise the weights (e.g., the first weight 390, the second weight 392, etc.). Rather, the mounting assemblies (e.g., the mounting assembly 100, the second mounting assembly 110, etc.) can be fixed to the surface 104 (e.g., the ground, a roof, etc.) with one or more cables.

In an example, the one or more cables may comprise first cables 1102 and/or second cables 1104. The first cables 1102 can be oriented substantially parallel to each other, and may extend non-parallel (e.g., perpendicular) to the axis 332 (e.g., illustrated in FIG. 3) along which the elongated openings 330 (e.g., illustrated in FIG. 3) of the mounting assembly 100 and the second mounting assembly 110 extend. The second cables 1104 can extend substantially parallel to each other, and may extend non-parallel (e.g., perpendicular) to the first cables 1102. In this way, the second cables 1104 can extend substantially parallel to the axis 332 (e.g., illustrated in FIG. 3) along which the elongated openings 330 (e.g., illustrated in FIG. 3) of the mounting assembly 100 and the second mounting assembly 110 extend. In an example, the system 1100 may not comprise all of the first cables 1102 and/or the second cables 1104 that are illustrated. Rather, the system 1100 may comprise one or more of the first cables 1102 and/or one or more of the second cables 1104.

Figure 12:
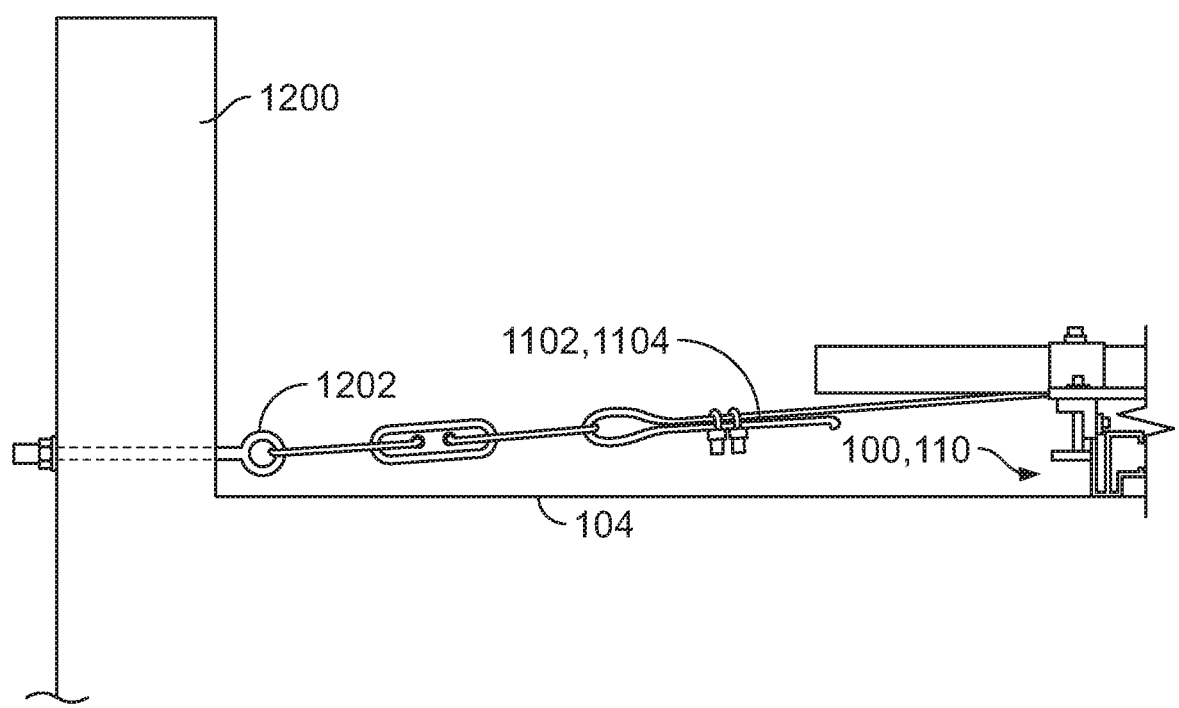
FIG. 12 is an illustration of a portion of an example assembly for mounting a solar panel to a surface.

Referring to FIG. 12, the first cables 1102 and/or the second cables 1104 can be anchored or secured in any number of ways. In an example, ends of the first cables 1102 and/or the second cables 1104 can be attached to a fixed structure 1200, such as a wall, for example. The ends of the first cables 1102 and/or the second cables 1104 can be attached to the fixed structure with an attachment structure 1202. In an example, the attachment structure 1202 (e.g., a screw, a bolt, etc.) can be inserted at least partially into the fixed structure (e.g., wall) such that the attachment structure 1202 is substantially fixed with respect to the fixed structure 1200. An end of the first cable 1102 and/or the second cable 1104 can be attached to the attachment structure 1202, such as by being inserted into an opening of the attachment structure 1202. An opposing end of the first cable 1102 and/or the second cable 1104 can be attached to an opposing fixed structure in a similar manner. In this way, the attachment of the first cables 1102 and/or the second cables 1104 to the fixed structure(s) 1200 can occur at a location that is lower and/or closer to the surface 104 than a location where the first cable 1102 and/or the second cable 1104 contacts the mounting assembly 100 and the second mounting assembly 110. As such, the first cable 1102 and/or the second cable 1104 can maintain the mounting assembly 100 and the second mounting assembly 110 in contact with the surface 104, and thus reduce the likelihood of inadvertent movement of the mounting assemblies 100, 110 relative to the surface 104. It will be appreciated that, in an example, the cable 1102, 1104 is not limited to the illustrated attachment method comprising the attachment structure 1202. Rather, in an example, the cable 1102, 1104 may be attached to a structure, such as a fastener, that may be attached to the surface 104. In this way, the cable 1102, 1104 can be directly attached to the surface 104, such as the ground.

Figure 13:
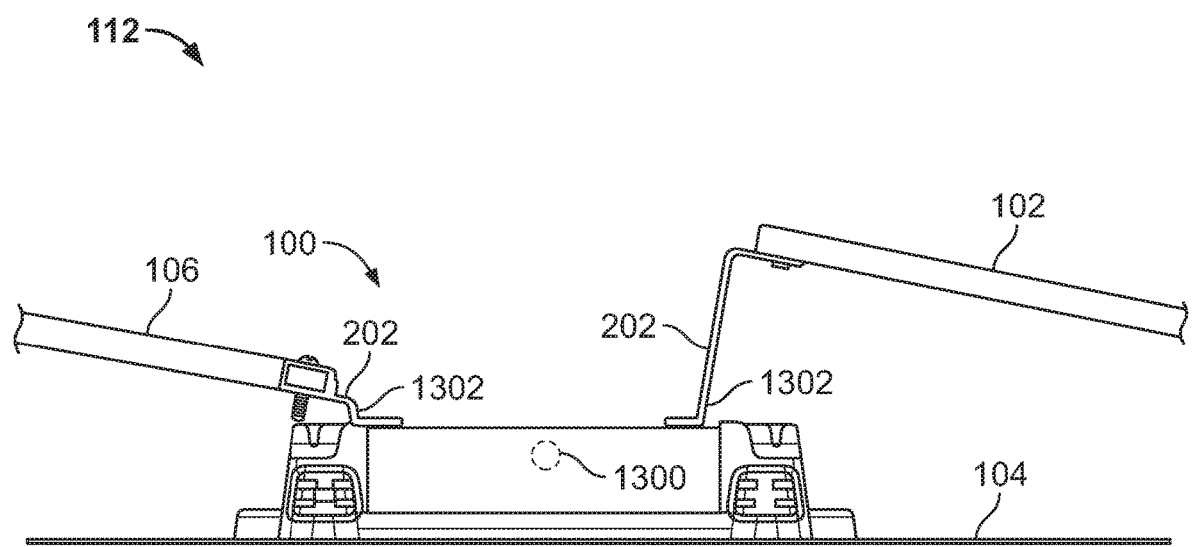
FIG. 13 is an illustration of an example mounting assembly for mounting a solar panel to a surface.

Referring to FIG. 13, the first cables 1102 and/or the second cables 1104 can be attached to the mounting assembly 100 and the second mounting assembly 110 in any number of ways. For example, the mounting assembly 100 (e.g., and the second mounting assembly 110, etc.) may define a first cable opening 1300. The first cable opening 1300 can be sized and shaped to receive one of the cables, such as the first cable 1102, for example. In this way, the first cable 1102 may pass through the cable opening 1300 to maintain the mounting assembly 100 in a fixed relationship relative to the surface 104. In an example, the module mounts 202 may define one or more second cable openings 1302. The second cable openings 1302 can be sized and shaped to receive one of the cables, such as the second cable 1104, for example. In this way, the second cable 1104 may pass through the second cable opening 1302 to maintain the mounting assembly 100 in a fixed relationship relative to the surface 104.

It will be appreciated that the first cables 1102 and/or the second cables 1104 are not limited to the illustrated examples. For example, the first cables 1102 and/or the second cables 1104 can be attached with respect to the mounting assembly 100 and/or the second mounting assembly 110 with additional mounting structures, such as brackets, mechanical fasteners, screws, bolts, etc. Likewise, the first cables 1102 and the second cables 1104 are not limited to extending perpendicular to each other. Rather, in an example, the first cables 1102 and the second cables 1104 can extend at an angle with respect to each other that is greater than or less than 90 degrees. In addition, in an example, the systems herein may use a combination of cables (e.g., 1102, 1104) and weights (e.g., 390, 392) to assist in securing the mounting assembly 100 and/or the second mounting assembly 110 relative to the surface 104. In these examples, the mounting assembly 100 and the second mounting assembly 110 can remain substantially fixed relative to the surface 104.

Figure 14B:
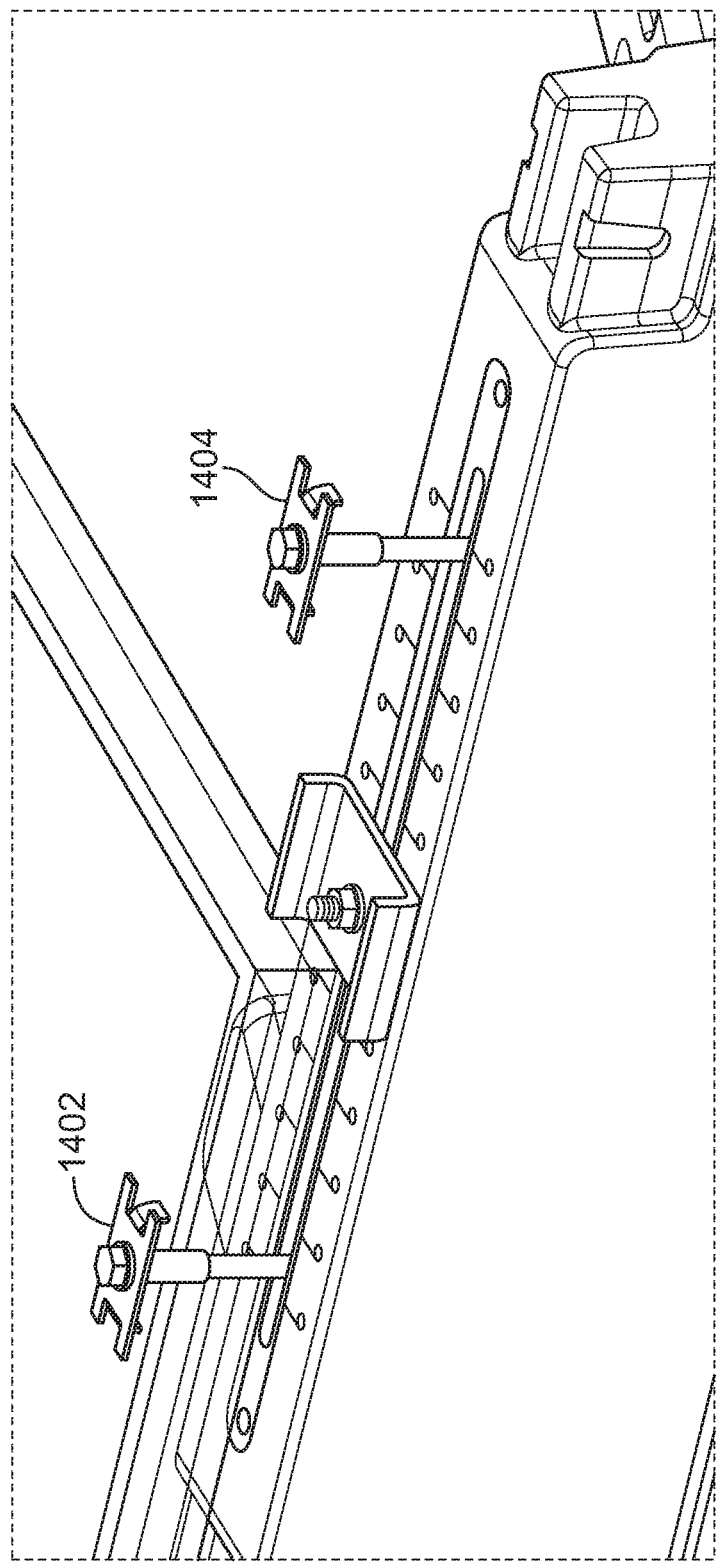
FIG. 14B is an illustration of an example mounting assembly for mounting a solar panel to a surface.

Referring to FIGS. 14A and 14B, an example of a system 1400 is illustrated. In an example, the system 1400 comprises one or more module mounts, such as a first module mount 1402 and a second module mount 1404. The module mounts 1402, 1404 can be received within the elongated opening 330 of the mounting assembly 100. In this way, the body portion 302 of the mounting assembly 100 can accommodate the module mounts 1402, 1404. By accommodating the module mounts 1402, 1404, the body portion 302 can be attached to the module mounts 1402, 1404 in a number of ways. In an example, the module mounts 1402, 1404 can be received within the elongated opening 330. Likewise, the module mounts 1402, 1404 can be clamped and/or fixed to the body portion 302 while not being received within the body portion 302. When the module mounts 1402, 1404 are received within the elongated opening 330, the module mounts 1402, 1404 can be movable within the elongated opening 330 so as to adjust a position of the module mounts 1402, 1404 relative to the body portion 302. In an example, a spacer 1406 can be received within the elongated opening 330 and may be positioned between the first module mount 1402 and the second module mount 1404.

In an example, the module mounts 1402, 1404 can assist in coupling the solar panel 102 to the mounting base 200. For example, the solar panel 102 can rest upon and/or be supported upon the mounting base 200. A clamp portion of the first module mount 1402 can contact an upper surface of the solar panel 102, so as to apply a downward force to the solar panel 102. Similarly, a second solar panel (not illustrated) could be located on an opposite side of the first module mount 1402. A third and a fourth solar panel can be attached to the mounting base 200 in a similar manner with the second module mount 1404. In this way, the module mounts 1402, 1404 can attach one or more solar panels to the mounting base 200. In an example, the spacer 1406 can function to space apart adjacent solar panels.

Figure 15A:
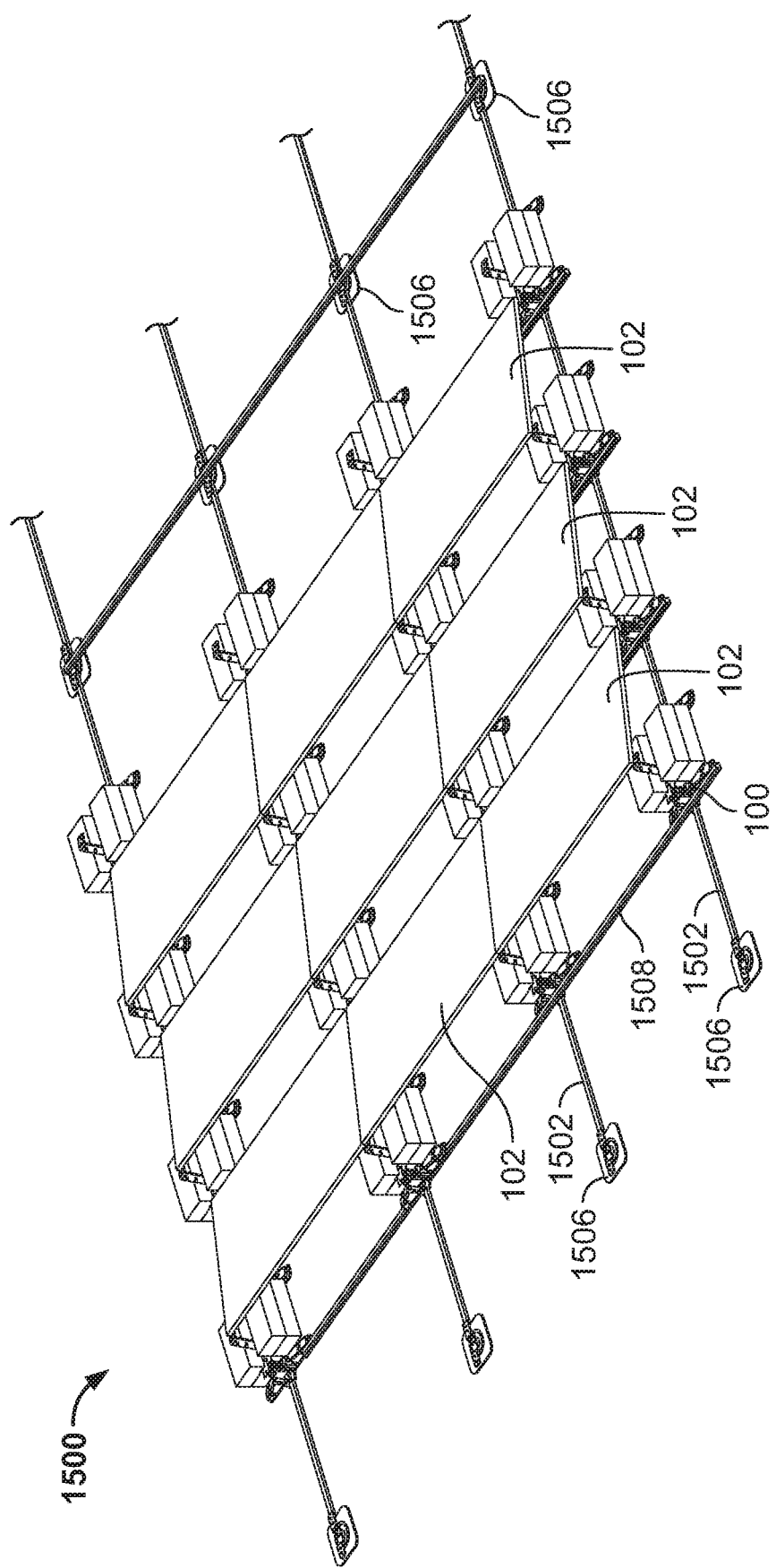
FIG. 15A is an illustration of an example mounting assembly for mounting a solar panel to a surface.
Figure 15B:
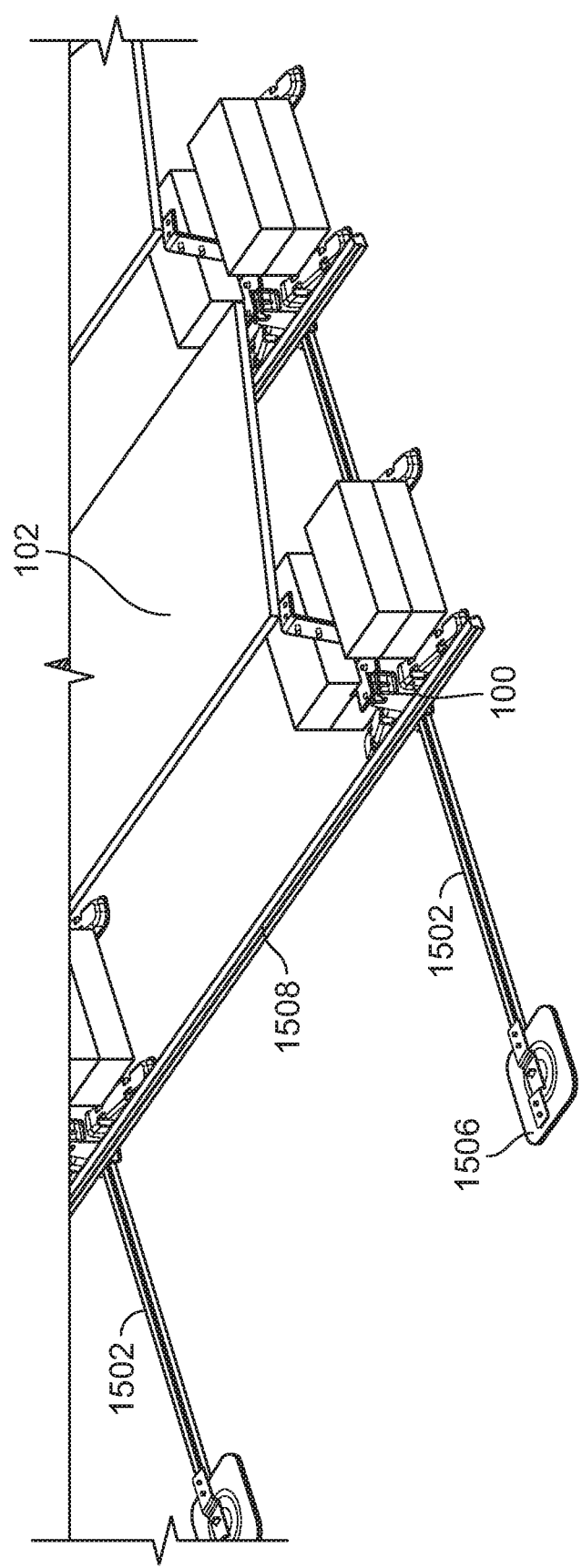
FIG. 15B is an illustration of an example mounting assembly for mounting a solar panel to a surface.

Referring to FIGS. 15A and 15B, an example of a system 1500 is illustrated. In an example, the system 1500 comprises one or more rails 1502. The one or more rails 1502 can be received within the rail opening 399 (e.g., illustrated in FIG. 3) of the mounting assembly 100. In an example, the rails 1502 can extend through one or more rail openings 399 of one or more mounting assemblies 100. In this way, a portion of the mounting assemblies 100 can be arranged in series with one of the rails 1502 extending through the series of mounting assemblies 100 (e.g., through the rail openings 399).

In an example, the rails 1502 can be anchored at opposing ends with an anchoring structure 1506. For example, one end of one of the rails 1502 can be anchored with one anchoring structure 1506 while an opposing end of the rail 1502 can be anchored with an opposing anchoring structure 1506. The anchoring structures 1506 can comprise any number of structures, such as mechanical fasteners, adhesives, or the like. In an example, the anchoring structures 1506 may comprise screws, bolts, etc. that can fasten the rails 1502 to the surface. In an example, a set of second rails 1508 may be provided extending non-parallel to the rails 1502. For example, the second rails 1508 may extend perpendicular to the rails 1502. The second rails 1508 can be attached to the mounting assemblies 100 and/or to the rails 1502 to provide further support.

In the example illustrated in FIGS. 15A and 15B, the rails 1502, 1508 can assist in attaching the mounting assemblies 100 to the surface. For example, due to the rails 1502 being anchored to the surface by the anchoring structures 1506, the mounting assemblies 100 may be limited from inadvertent movement, such as due to wind, earthquakes, or the like. As such, due to the rails 1502 being relatively fixed with respect to the surface, the solar panels 102 may likewise be limited from inadvertent movement. Another benefit of the rails 1502, 1508 is to allow for support of the solar panels 102 to a surface that is non-level. That is, in an example, the surface (e.g., a roof, for example) may be non-level. In this way, the rails 1502, 1508 can allow for the mounting assemblies 100 to be attached to the rails 1502, 1508 with a reduced likelihood of inadvertent movement, sliding, etc.

The system(s) herein provide a number of benefits. For example, due to the adjustability and/or movability of the solar panels relative to the mounting base(s), the solar panels can be oriented and/or moved so as to accommodate for surface structures on the surface 104, such as vents, air conditioners, etc. In an example, the solar panels can also be adjusted to reduce or increase the spacing between adjacent solar panels. Further, the module mounts can be interchanged and/or replaced so as to adjust the angles of the solar panels.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A mounting assembly for mounting a solar panel to a surface, the mounting assembly comprising:
   a mounting base configured to be supported on the surface, the mounting base defining an elongated opening that extends along an axis;
   a module mount configured to be coupled to the mounting base, the module mount comprising:
      a first mount portion configured to be received within the elongated opening of the mounting base such that the module mount is movable with respect to the mounting base along the axis; and
      a second mount portion configured to be coupled to the solar panel for mounting the solar panel to the surface through the mounting base;
   a second mounting base configured to be supported on the surface, the second mounting base defining a second elongated opening that extends along a second axis coaxial with the axis; and
   a second module mount configured to be coupled to the second mounting base, the second module mount comprising:
      a third mount portion configured to be received within the second elongated opening of the second mounting base such that the second module mount is movable with respect to the second mounting base along the second axis; and
      a fourth mount portion configured to be coupled to the solar panel for mounting the solar panel to the surface through the second mounting base.

2. The mounting assembly of claim 1, wherein the axis extends non-perpendicular to the surface.

3. The mounting assembly of claim 1, wherein the axis extends substantially parallel to the surface.

4. The mounting assembly of claim 1, wherein the mounting base comprises a leg portion configured to be supported on the surface, and a body portion, coupled to the leg portion, within which the elongated opening is defined.

5. The mounting assembly of claim 1, wherein the module mount comprises an intermediate mount portion that couples the first mount portion and the second mount portion.

6. The mounting assembly of claim 1, wherein the first mount portion comprises a fastener; and
   the fastener comprises a head larger in cross-sectional size than the elongated opening.

7. The mounting assembly of claim 1, wherein:
   the second mount portion is spaced a distance apart from the mounting base; and
   the fourth mount portion is spaced a second distance from the second mounting base.

8. The mounting assembly of claim 7, wherein the distance is different than the second distance.

9. The mounting assembly of claim 7, wherein the distance is the same as the second distance.

10. The mounting assembly of claim 1, wherein the second axis extends substantially parallel to the surface.

11. The mounting assembly of claim 1, wherein the second mount portion is non-parallel with respect to the first mount portion such that the solar panel is non-parallel with respect to the first mount portion when mounted to the surface through the mounting base.

* * * * *